(12) United States Patent
Colistro

(10) Patent No.: US 6,877,758 B2
(45) Date of Patent: Apr. 12, 2005

(54) PIVOTING IMPLEMENT HITCH EXTENSION

(75) Inventor: Vincent Colistro, Saskatoon (CA)

(73) Assignee: Schulte Industries Ltd., Saskatchewan (CA)

( * ) Notice: Subject to any disclaimer, the term of this patent is extended or adjusted under 35 U.S.C. 154(b) by 1 day.

(21) Appl. No.: 10/606,019

(22) Filed: Jun. 25, 2003

(65) Prior Publication Data

US 2004/0212176 A1 Oct. 28, 2004

(30) Foreign Application Priority Data

Apr. 28, 2003 (CA) ............................................. 2426630

(51) Int. Cl.$^7$ .............................................. B60D 1/167
(52) U.S. Cl. ....................... 280/494; 280/492; 180/14.4
(58) Field of Search ............................... 180/14.1, 14.4; 280/482, 492, 493, 494, 504, 515; 172/76, 79; 403/52, 53, 57

(56) References Cited

U.S. PATENT DOCUMENTS

| 3,557,892 | A | | 1/1971 | Burrough ................... 180/14.1 |
| 3,845,832 | A | * | 11/1974 | Glover ...................... 180/14.1 |
| 4,156,473 | A | * | 5/1979 | Myers et al. .............. 180/14.1 |
| 4,195,704 | A | | 4/1980 | Bass et al. ................. 180/14.1 |
| 4,403,670 | A | | 9/1983 | Sammarco ................. 180/14.1 |
| 5,355,971 | A | * | 10/1994 | Austin et al. .............. 180/53.1 |
| 5,531,283 | A | * | 7/1996 | Austin et al. .............. 180/53.1 |
| 5,706,901 | A | * | 1/1998 | Walters et al. ............. 172/439 |
| 6,203,049 | B1 | * | 3/2001 | Gibson ....................... 280/494 |
| 6,412,570 | B1 | * | 7/2002 | Pruitt et al. ................. 172/449 |
| 6,739,612 | B1 | * | 5/2004 | Colistro ..................... 280/475 |
| 2002/0047246 | A1 | * | 4/2002 | Harkcom et al. .......... 280/494 |

OTHER PUBLICATIONS

Bush Hog Operator's Manual Model 3715, p. 16—downloaded from Bush Hog web–site www.bushhog.com/ag-toc.html, hitch illustration.

* cited by examiner

Primary Examiner—Lesley D. Morris
Assistant Examiner—Daniel Yeagley
(74) Attorney, Agent, or Firm—John F. Salazar; Middleton Reutlinger

(57) ABSTRACT

A hitch extension apparatus for attaching an implement with a pto driven drive shaft having front and rear universal joints to a tractor drawbar. The apparatus comprises a first member adapted for attachment to the tractor drawbar by insertion of a drawbar pin through the drawbar such that the first member is fixed with respect to the drawbar. An extension member is pivotally attached to the first member about a horizontal pitch axis oriented perpendicular to the travel direction, and about a horizontal roll axis oriented parallel to the operating travel direction. The extension member defines a pivotal attachment location rearward of the draw pin hole adapted for pivotal attachment of the implement about a vertical yaw axis located equidistant from the front and rear universal joints when the drive shaft is connected to the tractor power take off. The pitch axis can be located forward of the yaw axis, and forward of the draw pin hole in order to reduce bending forces on the drawbar.

13 Claims, 5 Drawing Sheets

PIVOTING IMPLEMENT HITCH EXTENSION

CROSS REFERENCE TO PRIOR APPLICATION

This application claims priority to Canadian Patent Application No. 2,426,630, filed on Apr. 28, 2003, which is incorporated herein by reference.

TECHNICAL FIELD

This invention is in the field of towed implements and in particular power take off driven implements.

BACKGROUND OF THE INVENTION

Typically a tractor drawbar extends rearward from the tractor and has a vertical drawbar pin hole for attachment of an implement about a substantially vertical yaw axis so that the implement can pivot with respect to the tractor during turns. In a typical implement hitch it is also desirable to allow the implement to move independently of the tractor so that the implement can follow the ground. It is desired that the implement can pivot about a roll axis that is substantially parallel to the drawbar, and also about a pitch axis that is substantially perpendicular to the drawbar. These pitch and roll axes can be provided by a ball and socket connection however the degree of movement allowed is often not sufficient for the particular application. The axes can also be provided by an arrangement of pins through corresponding holes in brackets or the like, such as the hitch apparatus disclosed in U.S. Pat. No. 6,203,049 to Gibson. In lighter duty applications often a loose connection is simply provided at the draw bar attachment by using a small pin in a larger hole.

Implements such as rotary mowers also are typically powered by a drive shaft attached through a universal joint at the front end to the power take off (pto) of the tractor, and attached at the rear end through another universal joint to the implement drive line. In order to maintain constant velocity of the drive shaft, and thus avoid excessive vibration during turns, the vertical yaw axis, about which the implement and tractor pivot with respect to each other, should be located in the middle of the drive shaft, equidistant from each universal joint.

Such a configuration is disclosed in U.S. Pat. No. 3,557,892 to Burrough who uses a drawbar extension to move the yaw axis to the middle of the drive shaft. Similarly U.S. Pat. No. 4,195,704 to Bass et al. uses a drawbar extension for the same purpose. In U.S. Pat. No. 4,403,670 to Sammarco, the effective length of the drawbar itself is adjusted to accomplish the purpose of locating the yaw axis in the middle of the drive shaft.

The downward force exerted by an implement on the drawbar of a towing vehicle can be significant. For example, wing-type rotary mowers typically have wheels at the rear end thereof, and are supported at the front end by the drawbar of a towing tractor. Tractors with sufficient power to otherwise operate such mowers often do not have a drawbar with sufficient strength to bear the weight of the front hitch end of the mower.

Typically the tractor drawbar extends rearward from the tractor. The drawbar cantilevers out from the tractor, and when excessive weight is placed on the rear end of the drawbar, it can bend. The weight of the implement hitch exerts a bending force on the drawbar that is substantially equal to the weight of the implement hitch times the distance between the drawbar support on the tractor and the implement hitch.

Hitches in the prior art are also known where a mower is attached to the to the drawbar by a conventional drawbar pin in the drawbar hole, and includes a mechanism whereby the pitch axis is located forward of the drawbar hole. The weight of the implement is exerted downward at a fore and aft location dictated by the pitch axis which is perpendicular to the drawbar, and so the bending forces are reduced compared to conventional attachment where the pitch axis is located substantially at the drawbar hole, or rearward of the drawbar hole. In the Bush Hog™ hitch, the pitch axis is located above the roll axis, and the yaw axis is located at the drawbar hole.

In the prior art mechanisms for adjusting the position of the yaw axis to the middle of the drive shaft the distance between the drawbar support on the tractor and the implement hitch is increased, thereby increasing the bending forces on the drawbar. The weight of the implement is exerted substantially at the yaw axis. Especially with larger rotary mowers, the increased bending forces can be problematic, requiring a heavier drawbar than is normally provided on a tractor with sufficient power to otherwise operate the mower satisfactorily.

SUMMARY OF THE INVENTION

It is an object of the present invention to provide a hitch extension apparatus for attaching a pto driven implement to a tractor drawbar that overcomes problems in the prior art. It is a further object of the present invention to provide such an apparatus that provides a yaw axis located at the center of the drive shaft to reduce vibration, and also provides yaw, pitch, and roll axes to allow a towed implement to move independently to follow the ground. It is a further object of the present invention to provide such an apparatus that reduces bending forces on the tractor drawbar.

The present invention provides, in one embodiment, a hitch extension apparatus for attaching an implement to a tractor drawbar for towing in an operating travel direction, the tractor drawbar defining a drawbar hole, wherein the implement comprises a drive shaft having a rear universal joint at a rear end thereof connected to a driveline of the implement, and a front universal joint at a front end thereof adapted for attachment to a tractor power take off. The apparatus comprises a first member adapted for attachment to the tractor drawbar by insertion of a drawbar pin through the drawbar hole and through at least one corresponding draw pin hole defined by the first member, the first member configured such that same is substantially fixed with respect to the drawbar when the drawbar is placed in a drawbar location of the apparatus and the drawbar pin is inserted; and an extension member pivotally attached to the first member about a substantially horizontal pitch axis oriented substantially perpendicular to the operating travel direction, and pivotally attached to the first member about a substantially horizontal roll axis oriented substantially parallel to the operating travel direction. The extension member defines a pivotal attachment location at a rear end thereof rearward of the draw pin hole adapted for pivotal attachment of the implement about a substantially vertical yaw axis located substantially equidistant from the front and rear universal joints when the drive shaft is connected to the tractor power take off.

In a second aspect the invention provides a rotary mower apparatus for attachment to a tractor drawbar for towing in an operating travel direction. The tractor drawbar defines a drawbar hole, and the apparatus comprises a sleeve adapted for attachment to the tractor drawbar by insertion of a draw pin through the drawbar hole and through at least one corresponding draw pin hole defined by the sleeve, the sleeve configured such that same is substantially fixed with respect to the drawbar when the drawbar is in a drawbar location of the apparatus and the drawbar pin is inserted; and an extension member pivotally attached to the sleeve about a substantially horizontal pitch axis oriented substantially perpendicular to the operating travel direction, and pivotally attached to the sleeve about a substantially horizontal roll axis oriented substantially parallel to the operating travel direction. A rotary mower unit comprises a drive shaft having a front universal joint adapted for connection to a power take off of the tractor, and a rear universal joint connected to a driveline of the rotary mower unit. A front end of the rotary mower unit is pivotally attached to the extension member about a substantially vertical yaw axis located substantially equidistant from the front and rear universal joints when the drive shaft is connected to the tractor power take off.

To reduce bending forces on the drawbar compared to prior art devices having a yaw axis equidistant from the front and rear universal joints, the pitch axis can be located forward of the yaw axis, and to reduce them even further, the pitch axis can be located forward of the drawbar hole.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
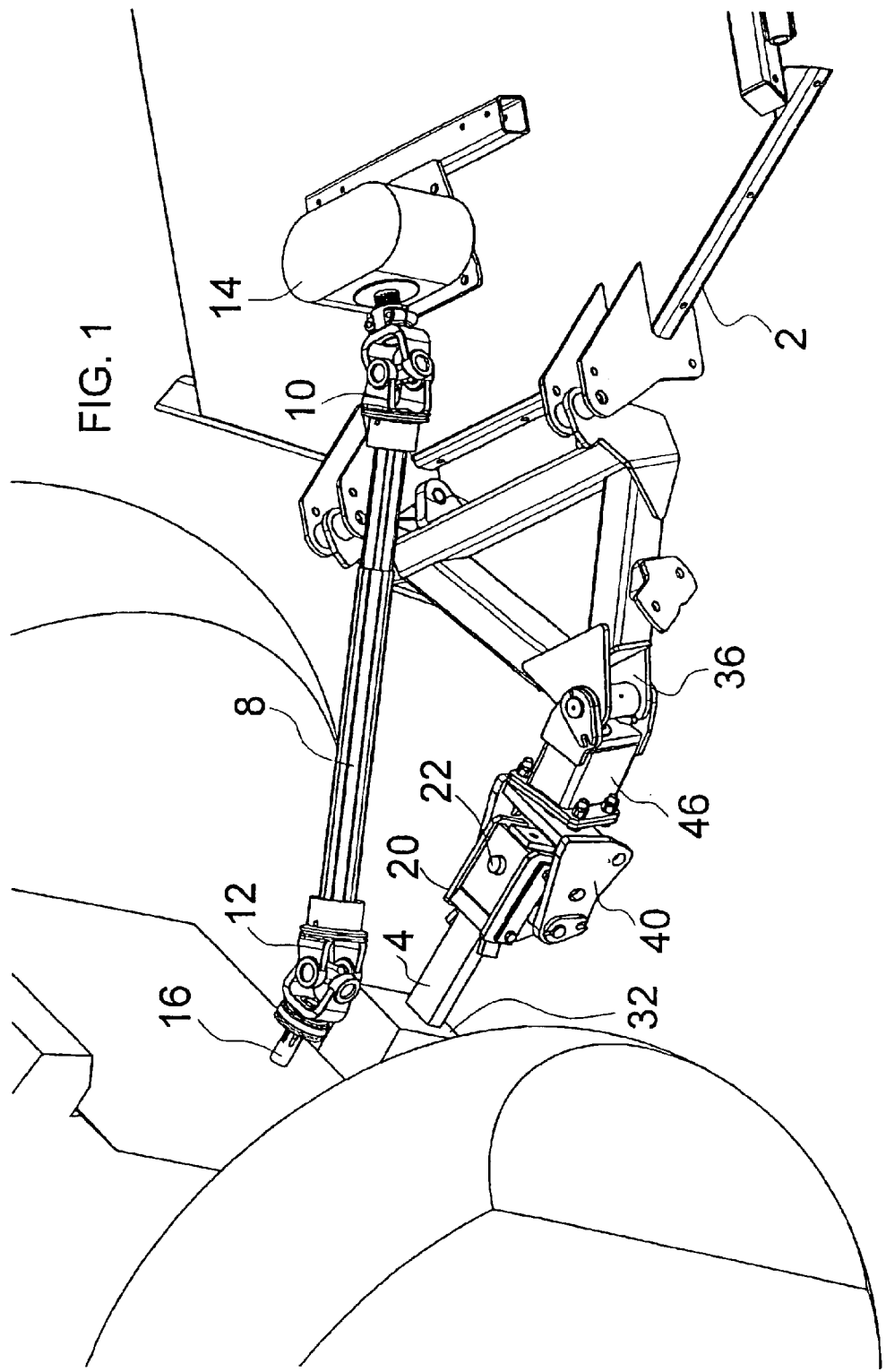
FIG. 1 is a perspective view of an embodiment of the invention in use to attach a rotary mower unit to a tractor.
Figure 2:
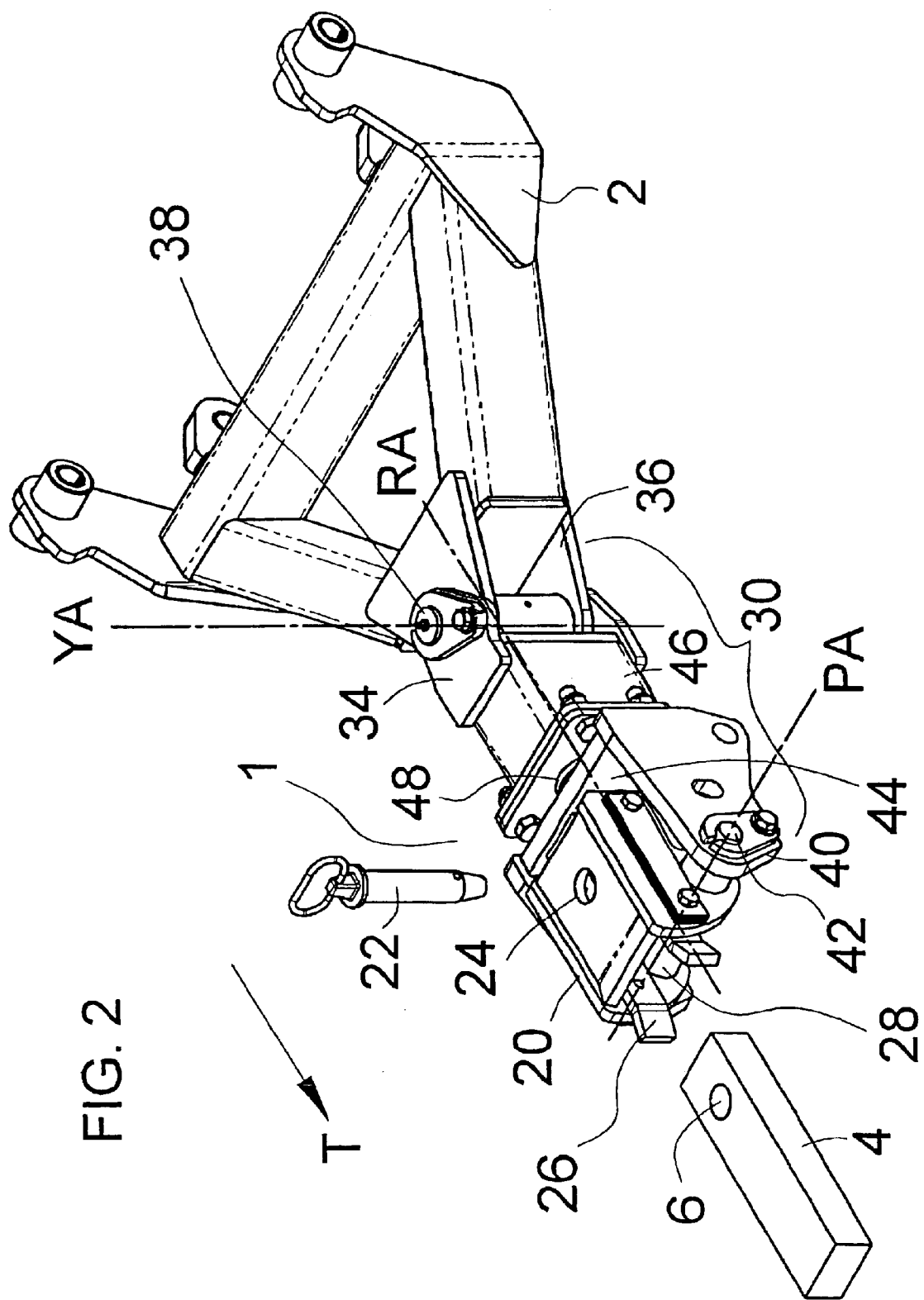
FIG. 2 is a perspective view of the embodiment of FIG. 1 with the tractor drawbar removed from the apparatus.

FIGS. 1–4 illustrate a hitch extension apparatus 1 for attaching an implement, illustrated as a rotary mower unit 2, to a tractor drawbar 4 for towing in an operating travel direction T. The tractor drawbar 4 defines a drawbar hole 6. The rotary mower unit 2 comprises a drive shaft 8 having a rear universal joint 10 at a rear end thereof connected to a driveline 14 of the rotary mower unit 2, and a front universal joint 12 at a front end thereof adapted for attachment to a tractor power take off 16 with a coupler or the like.

The hitch extension apparatus 1 comprises a first member, illustrated as sleeve 20, adapted for attachment to the tractor drawbar 4 by insertion of a drawbar pin 22 through the drawbar hole 6 and through corresponding top and bottom draw pin holes 24 defined by upper and lower portions of the sleeve 20. The sleeve 20 slides over the drawbar 4. The drawbar 4 fits the drawbar location 28 defined by the walls 26 of the sleeve 20 such that the sleeve 20 is substantially fixed with respect to the drawbar 4 when the drawbar pin 22 is inserted.

An extension member 30 is pivotally attached to the sleeve 20 about a substantially horizontal pitch axis PA oriented substantially perpendicular to the operating travel direction T, and is also pivotally attached to the sleeve 20 about a substantially horizontal roll axis RA oriented substantially parallel to the operating travel direction T. In the illustrated embodiment the pitch axis PA is located forward of the draw pin holes 24 so that the downward force exerted by the weight of the rotary mower unit 2 is exerted on the drawbar 4 forward of the draw pin holes 24 and drawbar hole 6. As can be seen in FIG. 1, the drawbar 4 cantilevers out from the drawbar support 32 which supports the drawbar 4. Moving the location of the downward force on the drawbar 4 closer to the drawbar support 32 reduces the bending forces on the drawbar 4.

The extension member 30 also defines a pivotal attachment location at a rear end thereof rearward of the draw pin holes 24 adapted for pivotal attachment of the rotary mower unit 2 about a substantially vertical yaw axis YA. The pivotal attachment location is provided in the illustrated embodiment by holes in upper and lower rear plates 34 spaced to accommodate the hitch 36 of the rotary mower unit 2 between them, and a yaw pin 38 inserted in the holes in rear plates 34 and through the hitch 36. Thus the rotary mower unit 2 is allowed to pivot with respect to the extension member 30 only about the yaw axis YA.

Figure 3:
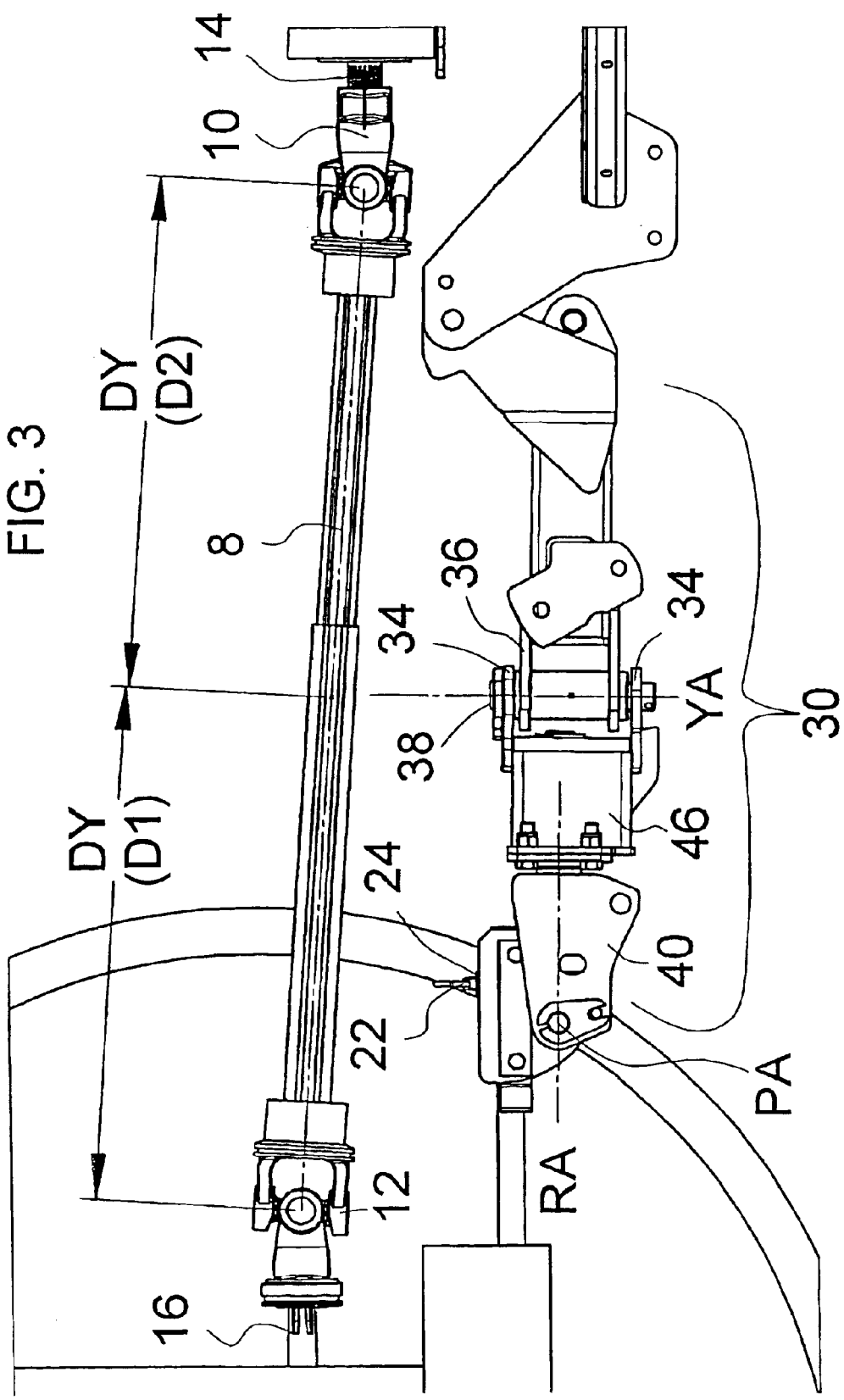
FIG. 3 is a side view of the embodiment of FIG. 1.
Figure 4:
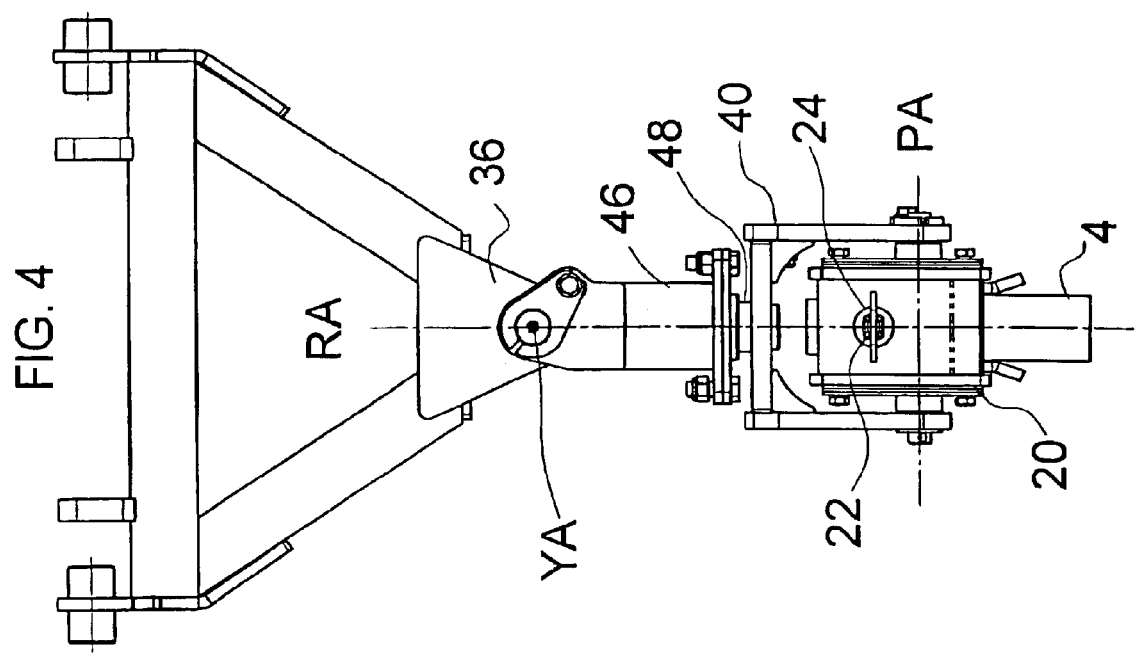
FIG. 4 is a top view of the embodiment of FIG. 1.

The extension member 30 is sized such that the yaw axis is located substantially equidistant from the front and rear universal joints 12, 10 when the drive shaft 8 is connected to the tractor power take off 16, as best seen in FIG. 3 where the distances DY from the front and rear universal joints 12, 10 to the yaw axis YA are substantially equal. Thus the velocity of the drive shaft 8 is maintained constant as the rotary mower unit 2 pivots with respect to the tractor about the yaw axis YA, and vibration is reduced.

In the embodiment illustrated in FIGS. 1–4 the extension member comprises a pitch member 40 pivotally attached to the sleeve 20 about a pitch pin 42 that extends through corresponding holes defined by the pitch member 40 and provides the pitch axis PA located forward of the draw pin hole 24. The illustrated location of the pitch pin 42 is below the drawbar 4 to leave room above so that the hitch extension apparatus 1 does not interfere with hooking up the drive shaft 8 to the tractor power take off 16.

In turn a roll member 46 is pivotally attached to a rear portion of the pitch member 40 about the roll axis RA. The illustrated pitch member 40 comprises a cross-plate 44 located rearward of the sleeve 20 and oriented substantially parallel to the pitch axis PA. A shaft 48 extends rearward from the cross-plate 44 into a corresponding socket in the roll member 46 such that the roll member 46 pivots with respect to the pitch member 40 about the roll axis RA.

The roll member 46 in turn defines the pivotal attachment location at a rear end thereof adapted for pivotal attachment of the implement about the yaw axis at the above described and lower rear plates 34.

Figure 5:
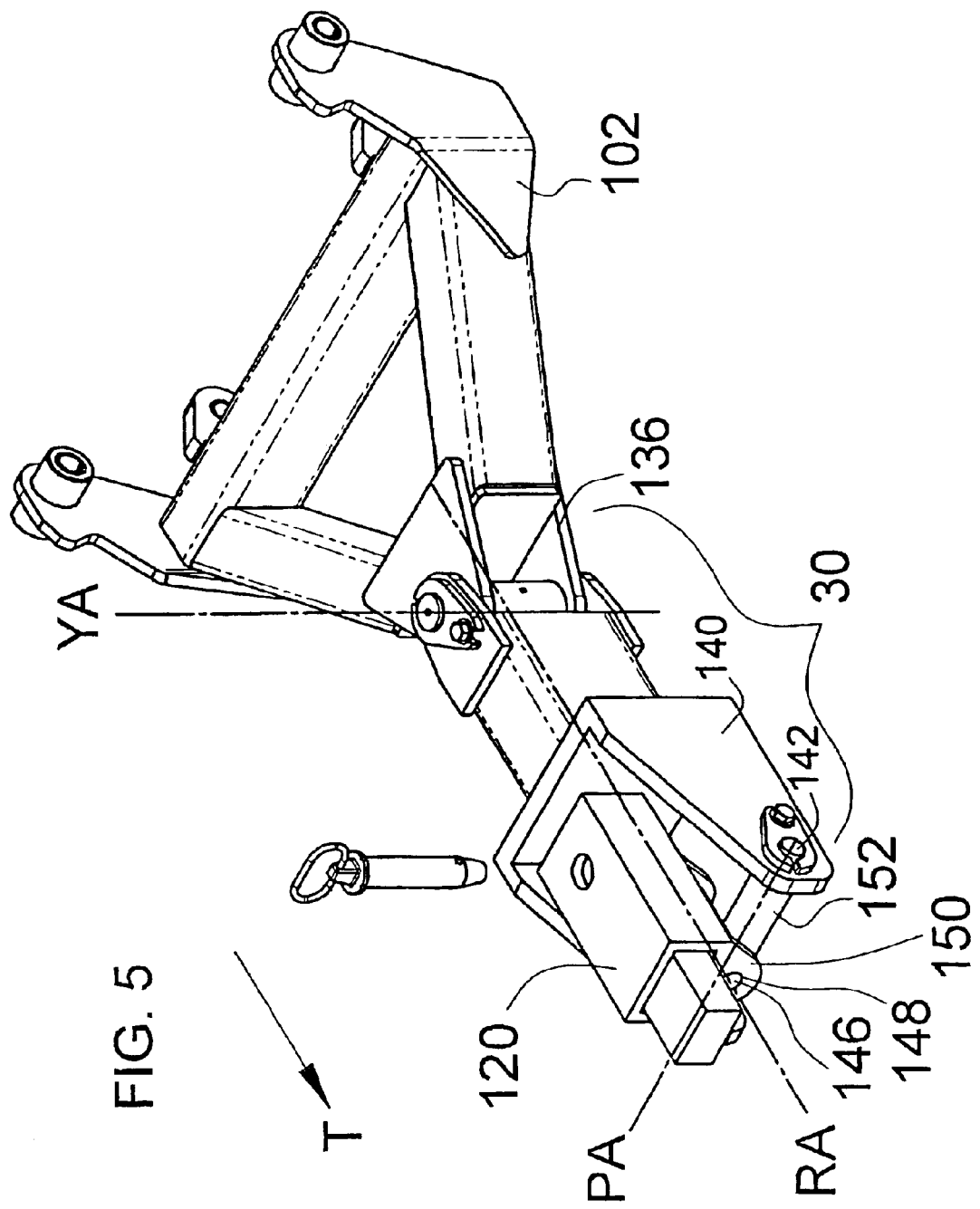
FIG. 5 is a perspective view of an alternate embodiment.

FIG. 5 illustrates an alternate embodiment of the extension member 30 wherein the extension member comprises a roll member 146 pivotally attached to the sleeve 120 about the roll axis RA, and a pitch member 140 pivotally attached to the roll member 146 about the pitch axis PA. The pitch member 140 defines the pivotal attachment location at the rear end thereof for attachment of the hitch 136 of the rotary mower unit 102 about the yaw axis.

The roll member 146 comprises a shaft through a hole 148 in each of a pair of lugs 150 extending down from the sleeve 120. The shaft provides the roll axis RA. A cross tube 152 is attached to the shaft such that a pitch pin 142 inserted therethrough provides the pitch axis PA.

The hitch extension apparatus 1 of the invention thus provides a yaw axis YA located rearward of the drawbar hole 6 at the mid-point of the drive shaft 8 as is desirable to reduce vibration, and further provides the desired pitch and roll axes PA, RA that allow independent movement of the implement so that same can follow the ground.

The illustrated embodiments also reduce bending forces on the drawbar 4 by moving the pitch axis PA forward of the drawbar hole 6. Alternatively, where bending forces are not a factor, the pitch axis PA could be located at the yaw axis YA such that the weight of the implement is carried at a location similar to that of prior art hitches for locating the yaw axis YA at the midpoint of the driveshaft. To reduce the bending forces to a lesser degree, the pitch axis PA could be located between the yaw axis YA and the drawbar hole 6.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. A hitch extension apparatus for attaching an implement to a tractor drawbar for towing in an operating travel direction, the tractor drawbar defining a drawbar hole, wherein the implement comprises a drive shaft having a rear universal joint at a rear end thereof connected to a driveline of the implement, and a front universal joint at a front end thereof adapted for attachment to a tractor power take off, the apparatus comprising:

a first member adapted for attachment to the tractor drawbar by insertion of a drawbar pin through the drawbar hole and through at least one corresponding draw pin hole defined by the first member, the first member configured such that same is substantially fixed with respect to the drawbar when the drawbar is placed in a drawbar location of the apparatus and the drawbar pin is inserted;

an extension member pivotally attached to the first member about a substantially horizontal pitch axis located forward of the at least one draw pin hole and oriented substantially perpendicular to the operating travel direction, and pivotally attached to the first member about a substantially horizontal roll axis oriented substantially parallel to the operating travel direction;

wherein the extension member defines a pivotal attachment location at a rear end thereof rearward of the draw pin hole adapted for pivotal attachment of the implement about a substantially vertical yaw axis located substantially equidistant from the front and rear universal joints when the drive shaft is connected to the tractor power take off.

2. The apparatus of claim 1 wherein the first member comprises a sleeve adapted to slide over the draw bar, and defines top and bottom draw pin holes.

3. The apparatus of claim 1 wherein the extension member comprises:

a pitch member pivotally attached to the first member about the pitch axis;

a roll member pivotally attached to the pitch member about the roll axis; and wherein the roll member defines the pivotal attachment location at a rear end thereof adapted for pivotal attachment of the implement about the yaw axis.

4. The apparatus of claim 1 wherein the extension member comprises:

a roll member pivotally attached to the first member about the roll axis;

a pitch member pivotally attached to the roll member about the pitch axis; and wherein the pitch member defines the pivotal attachment location at a rear end thereof adapted for attachment of the implement about the yaw axis.

5. The apparatus of claim 3 further comprising a pin extending from each side of the sleeve coincidental with the pitch axis, and wherein the pin extends through a corresponding hole defined by the pitch member on each side of the sleeve.

6. The apparatus of claim 5 wherein the pitch member comprises a cross-plate located rearward of the sleeve and oriented substantially parallel to the pitch axis, and wherein the roll member is pivotally attached to the cross-plate about the roll axis.

7. The apparatus of claim 1 wherein the pitch axis is oriented such that the pitch axis passes through or below the drawbar location.

8. A rotary mower apparatus for attachment to a tractor drawbar for towing in an operating travel direction, the tractor drawbar defining a drawbar hole, the apparatus comprising:

a sleeve adapted for attachment to the tractor drawbar by insertion of a draw pin through the drawbar hole and through at least one corresponding draw pin hole defined by the sleeve, the sleeve configured such that same is substantially fixed with respect to the drawbar when the drawbar is in a drawbar location of the apparatus and the drawbar pin is inserted;

an extension member pivotally attached to the sleeve about a substantially horizontal pitch axis located forward of the at least one draw pin hole oriented substantially perpendicular to the operating travel direction, and pivotally attached to the sleeve about a substantially horizontal roll axis oriented substantially parallel to the operating travel direction;

a rotary mower unit comprising a drive shaft having a front universal joint adapted for connection to a power take off of the tractor, and a rear universal joint connected to a driveline of the rotary mower unit;

wherein a front end of the rotary mower unit is pivotally attached to the extension member about a substantially vertical yaw axis located substantially equidistant from the front and rear universal joints when the drive shaft is connected to the tractor power take off.

9. The apparatus of claim 8 wherein the extension member comprises:

a pitch member pivotally attached to the sleeve about the pitch axis;

a roll member pivotally attached to the pitch member about the horizontal roll axis;

wherein the rotary mower unit is pivotally attached to a rear end of the roll member about the yaw axis.

10. The apparatus of claim 8 wherein the extension member comprises:

a roll member pivotally attached to the sleeve about the roll axis;

a pitch member pivotally attached to the roll member about the pitch axis; and wherein the rotary mower unit is pivotally attached to a rear end of the pitch member about the yaw axis.

11. The apparatus of claim 9 further comprising a pin extending from each side of the sleeve coincidental with the pitch axis, and wherein the pin extends through a corresponding hole defined by the pitch member on each side of the sleeve.

12. The apparatus of claim 11 wherein the pitch member comprises a cross-plate located rearward of the sleeve and oriented substantially parallel to the pitch axis, and wherein the roll member is pivotally attached to the cross-plate about the roll axis.

13. The apparatus of claim 8 wherein the pitch axis is oriented such that the pitch axis passes through or below the drawbar location.

* * * * *